United States Patent
Hanenkamp et al.

(10) Patent No.: US 7,757,650 B2
(45) Date of Patent: Jul. 20, 2010

(54) GAS ENGINE AND IGNITION DEVICE FOR A GAS ENGINE

(75) Inventors: Axel Hanenkamp, München (DE); Heribert Imkamp, Augsburg (DE)

(73) Assignee: MAN Diesel SE, Augsburg (DE)

(*) Notice: Subject to any disclaimer, the term of this patent is extended or adjusted under 35 U.S.C. 154(b) by 880 days.

(21) Appl. No.: 11/582,777

(22) Filed: Oct. 18, 2006

(65) Prior Publication Data

US 2007/0099133 A1   May 3, 2007

(30) Foreign Application Priority Data

Oct. 19, 2005   (DE) .................... 10 2005 050 435

(51) Int. Cl.
*F02B 19/06*   (2006.01)
(52) U.S. Cl. .............. 123/143 R; 123/145 A; 219/270
(58) Field of Classification Search ........... 123/143 R, 123/143 B, 145 A, 145 R; 219/270; 313/15
See application file for complete search history.

(56) References Cited

U.S. PATENT DOCUMENTS

| | | | |
|---|---|---|---|
| 4,434,753 A | * | 3/1984 | Mukainakano et al. .. 123/143 B |
| 4,582,981 A | * | 4/1986 | Brooks et al. ............... 219/270 |
| 4,762,101 A | * | 8/1988 | Manolis .................. 123/145 A |
| 5,251,589 A | * | 10/1993 | Duba et al. ............. 123/145 A |
| 5,922,229 A | * | 7/1999 | Kurano ....................... 219/270 |
| 6,812,432 B1 | * | 11/2004 | Haluschka et al. .......... 219/270 |
| 6,843,220 B2 | | 1/2005 | Lausch et al. |
| 6,854,438 B2 | * | 2/2005 | Hilger et al. ................ 123/260 |
| 7,040,270 B2 | * | 5/2006 | Herdin et al. ........... 123/143 B |

\* cited by examiner

*Primary Examiner*—Willis R. Wolfe, Jr.
*Assistant Examiner*—Johnny H Hoang
(74) *Attorney, Agent, or Firm*—Cohen Pontani Lieberman & Pavane LLP

(57) ABSTRACT

The gas engine for burning a gaseous fuel-air mixture includes a combustion chamber containing the gaseous fuel-air mixture, at least one ignition device projecting into the combustion chamber to ignite the gaseous fuel-air mixture and having a heating device serving as an ignition source, and a mounting unit separating the heating device from the fuel-air mixture to be ignited. The mounting unit includes a heatable section in contact with the fuel-air mixture to be ignited, and the heating device is designed to heat the heatable section in such a way that the heatable section has a temperature required to ignite the fuel-air mixture.

12 Claims, 1 Drawing Sheet

GAS ENGINE AND IGNITION DEVICE FOR A GAS ENGINE

BACKGROUND OF THE INVENTION

The invention pertains to a gas engine and to an ignition device for a gas engine.

A gaseous fuel-air mixture is burned in gas engines, wherein the gaseous fuel-air mixture is ignited by means of at least one ignition device of the gas engine. In gas engines known from the state of the art, the ignition device or each of the ignition devices is designed as a sparkplug, which projects either into an undivided combustion chamber or into a precombustion chamber space divided off from the main combustion chamber, and ignites the gaseous fuel-air mixture in the combustion chamber or precombustion chamber. High ignition energies and temperatures are required for ignition, and these energies and temperatures increase disproportionately as engine power increases.

A gas engine in which high ignition energies for igniting the gaseous fuel-air mixture can be avoided is known from U.S. Pat. No. 6,843,220. In this document, the gaseous fuel-air mixture is ignited by means of an ignition device, in which an ignition source of the ignition device which provides the ignition energy is in immediate or direct contact with the fuel-air mixture to be ignited or with a gaseous atmosphere derived from the fuel-air mixture to be ignited. According to this state of the art, therefore, the ignition source of the ignition device is exposed to corrosive conditions, as a result of which premature wear can occur. This results ultimately in a shortened service life or in shortened maintenance intervals and thus in increased operating costs for the gas engine.

SUMMARY OF THE INVENTION

It is an object of the present invention to provide a novel gas engine and a novel ignition device for a gas engine.

According to a preferred embodiment of the invention, the gas engine for burning a gaseous fuel-air mixture includes a combustion chamber containing the gaseous fuel-air mixture, at least one ignition device projecting into the combustion chamber to ignite the gaseous fuel-air mixture and having a heating device serving as an ignition source, and a mounting unit separating the heating device from the fuel-air mixture to be ignited. The mounting unit includes a heatable section in contact with the fuel-air mixture to be ignited, and the heating device is designed to heat the heatable section in such a way that the heatable section has a temperature required to ignite the fuel-air mixture.

The ignition source of the ignition device is preferably located in the mounting unit of the ignition device, wherein the mounting unit separates the ignition source, which is designed as a heating device, from the fuel-air mixture, so that the ignition source is never exposed to corrosive conditions. The heating device heats the heatable section of the mounting unit which is in contact with the fuel-air mixture to be ignited in such a way that this section of the mounting unit has a temperature required to ignite the fuel-air mixture, i.e., a so-called "hot-spot" temperature. Because the ignition source is separated from the corrosive atmosphere of the fuel-air mixture to be ignited, the service life of the ignition device of the gas engine is increased.

The geometry and/or the material of the section of the mounting unit to be heated is preferably designed and/or selected in such a way that the heating device heats a surface of the section facing the fuel-air mixture to be ignited to the temperature required for igniting the gaseous fuel-air mixture.

According to a preferred embodiment of the invention, the heating device or each of the heating devices is designed as an electrical heating device, wherein the electrical heating device is located in the associated sleeve-like mounting unit, wherein a sealing element closes off the sleeve-like mounting unit at the end opposite the section to be heated, and wherein a spring element acting on the heating device and the sealing element urges the heating device against the section of the sleeve-like mounting unit to be heated, namely, against a surface of the mounting unit facing away from the fuel-air mixture.

According to a preferred alternative embodiment of the invention, the heating device is designed as a laser heating device, wherein a sealing element closes off the sleeve-like mounting unit at the end opposite the section to be heated, wherein the sealing element comprises a coupling unit for at least one optical fiber and a focusing unit, and wherein the laser light produced by the laser heating device and coupled via the one or more optical fibers into the associated mounting unit is focused by the focusing unit on the section to be heated, namely, on a surface of the unit facing away from the fuel-air mixture.

Correspondingly, the ignition device for a gas engine according to the invention comprises a heating device serving as an ignition source, and a mounting unit separating the heating device from the fuel-air mixture to be ignited, wherein the mounting unit comprises a heatable section in contact with the fuel-air mixture to be ignited, and wherein the heating device is designed to heat the heatable section in such a way that the heatable section has a temperature required to ignite the fuel-air mixture.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained in greater detail below with reference to the drawings, but the invention is not to be considered limited to these examples.

DETAILED DESCRIPTION OF THE PRESENTLY PREFERRED EMBODIMENTS

Figure 1:
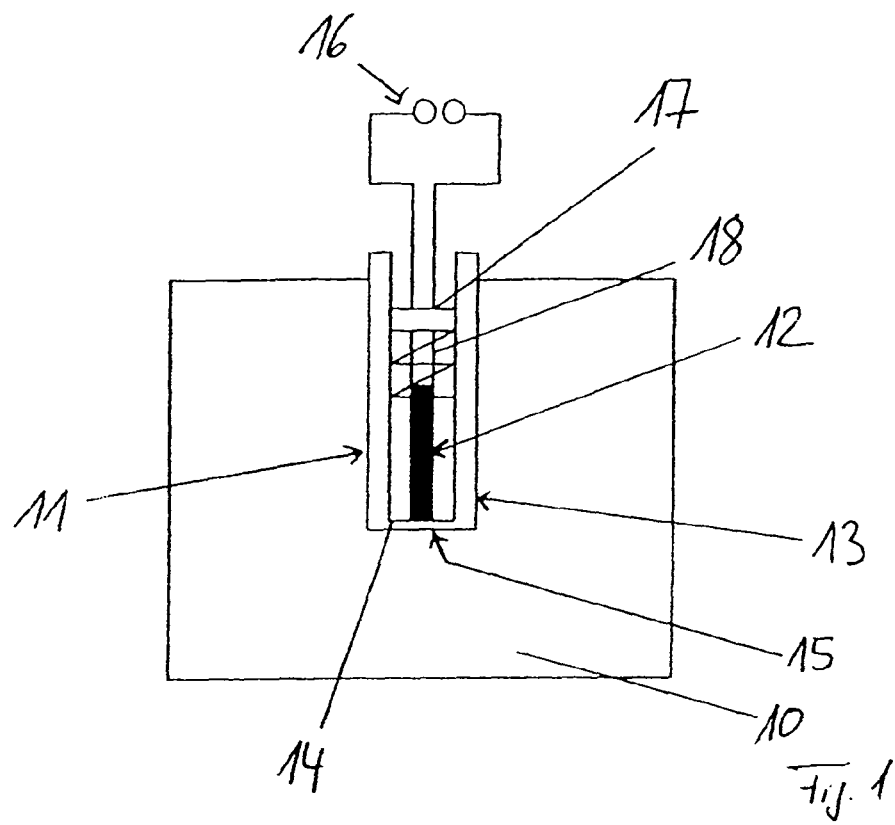
FIG. 1 is a schematic diagram of an inventive gas engine according to a first exemplary embodiment of the invention.

FIG. 1 shows a schematic diagram of a gas engine, especially a gas Otto engine, wherein an ignition device 11 projects into a combustion chamber 10 of the gas engine to ignite a gaseous fuel-air mixture, which is present in the combustion chamber 10. In the exemplary embodiment shown here, the combustion chamber 10 is designed as an undivided combustion chamber.

The invention, however, is not limited to gas engines with an undivided combustion chamber. On the contrary, the invention can also be used in gas engines which have a divided combustion chamber consisting of a main combustion chamber and a precombustion chamber. In this case, the ignition device then projects into a precombustion chamber space of the gas engine.

The ignition device 11 shown in FIG. 1 has an ignition source, designed as a heating device 12, which is positioned or mounted in a sleeve-like mounting unit 13. The mounting unit 13 separates or divides the heating device 12 and thus the ignition source from the corrosive atmosphere in the combustion chamber 10 of the gas engine. The heating device 12 provides the energy, in the form of heating power, required to ignite the gaseous fuel-air mixture, where the heating device 12 heats a section 14 of the mounting unit 13 to a temperature required for igniting the fuel-air mixture. The section 14 which is heated by the heating device 12 of the ignition device 11 is, in the present embodiment, a disk-shaped end part of the sleeve-like mounting unit 13.

The geometry and/or material of the section 14 to be heated of the sleeve-like mounting unit 13 is designed and/or selected in such a way that the heating power provided by the heating device 12 is sufficient to heat the section 14 to the temperature required for igniting the fuel-air mixture. The section 14 is heated in such a way that the surface 15 of the section which faces the fuel-air mixture to be ignited has the temperature required to ignite the fuel-air mixture.

In the exemplary embodiment according to FIG. 1, the heating device 12 serving as the ignition source is designed as an electrical resistance heating device, where the heating power of the heating device 12 depends on the voltage applied to the heating device 12 by a voltage source 16.

As can be seen in FIG. 1, the sleeve-like mounting unit 13 is closed off by a sealing element 17 at the end opposite the section 14 to be heated, where a spring element 18 is supported against the sealing element 17 and against the heating device 12. The spring element 18 keeps the heating device 12 pressed at all times against the section 14 of the sleeve-like mounting unit 11 to be heated, namely, against a surface of the unit facing away from the fuel-air mixture, and is thus able to compensate for heat-induced changes in the length of the heating device 12 during operation. As a result, it can be guaranteed that the section 14 of the heating device 12 can always be heated to the temperature required to ignite the gaseous fuel-air mixture.

Figure 2:
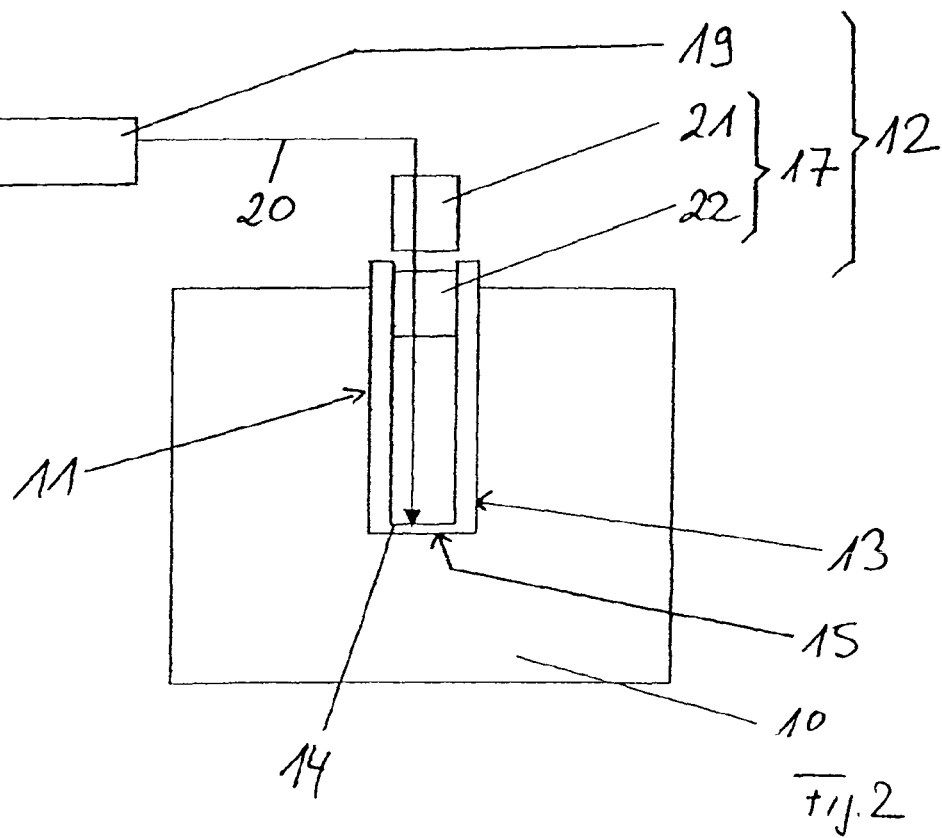
FIG. 2 is a schematic diagram of an inventive gas engine according to a second exemplary embodiment of the invention.

A second exemplary embodiment of an inventive gas engine is shown by the schematic diagram of FIG. 2, where, to avoid unnecessary repetition, the same reference numerals are used to designate the same components.

In the exemplary embodiment of FIG. 2, the heating device 12 serving as the ignition source is designed as a laser heating device, where a laser beam produced by a laser source 19 is conducted through at least one optical fiber 20 to the section 14 of the sleeve-like mounting unit 11 to be heated. The sealing element 17 of the sleeve-like mounting unit 13 comprises a coupling unit 21 and a focusing unit 22, wherein, by means of the coupling unit 21, the one or more optical fibers 20 can be coupled into the mounting device 13, and wherein, by means of the focusing unit 22, the laser light which has been produced by the laser device 19 and coupled via the one or more optical fibers 20 into the mounting unit 13 can be focused onto the section 14 of the mounting unit 13 to be heated, namely, on a surface of the unit facing away from the fuel-air mixture. The energy of the laser beam thus heats the surface 15 of the section 14 facing the gaseous fuel-air mixture to be ignited to the temperature required for igniting the fuel-air mixture. The laser source 19 can be a laser source which generates a laser beam which varies in a periodic or pulsed manner, or it can be a laser source which generates a continuous, constant laser beam.

It should be pointed out that the use of an ignition source designed as an electrical heating device or as a laser heating device is preferred. It is also possible, however, to use any other type of suitable heating device as the ignition source to heat the section of the mounting unit which separates the heating device from the corrosive atmosphere in the combustion chamber.

In accordance with the present invention, therefore, the ignition of a gaseous fuel-air mixture in a combustion chamber or in a precombustion chamber of a gas engine takes place in that heating power provided by a heating device 12 serving as the ignition source is conducted by heat transfer from the heating device 12, which is separated by the mounting unit 13 from the fuel-air mixture to be ignited, to the mounting unit 13, so that the surface 15 of the section 14 facing the fuel-air mixture has the temperature required for ignition.

Because the heating device 12 is separated from the corrosive atmosphere of the fuel-air mixture, the wear of the heating device 12 is minimized, as a result of which the service life of the ignition device 11 can be increased. Maintenance work on the gas engine or on the one or more ignition devices 11 can also be reduced.

So that the ignition device 11 can be integrated easily into a gas engine, the mounting unit 13, in which the ignition source designed as a heating device 12 is at least partially mounted, is screwed to a wall forming a boundary of the combustion chamber of the gas engine, where, for this purpose, an external thread of the sleeve-like mounting unit 13 cooperates with an internal thread provided in a bore in a wall of the gas engine forming a boundary of the combustion chamber 10. As a result, an ignition device 11 can be easily integrated into the gas engine or mounted therein.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gas engine for burning a gaseous fuel-air mixture, comprising:

a combustion chamber or a precombustion chamber receiving the gaseous fuel-air mixture;

at least one ignition device projecting into the combustion chamber or the precombustion chamber to ignite the gaseous fuel-air mixture and comprising a heating device as an ignition source; and a mounting unit separating the heating device from the fuel-air mixture to be ignited, wherein the mounting unit comprises a heatable section in contact with the fuel-air mixture to be ignited, and wherein the heating device is configured to heat the heatable section to a temperature required to ignite the fuel-air mixture, the mounting unit being sleeve-shaped and the heatable section comprising a disk-shaped end part of the sleeve-shaped mounting unit, a geometry and a material of the heatable section being configured such that a first surface of the heatable section facing the fuel-air mixture is heatable by the heating device to the temperature required to ignite the fuel-air mixture.

2. The gas engine of claim 1, wherein the heating device is an electrical heating device.

3. The gas engine of claim 1, further comprising a spring element urging the heating device against the heatable section.

4. The gas engine of claim 3, wherein the heatable section comprises a second surface facing away from the fuel-air mixture, and wherein the spring element urges the heating device against the second surface facing away from the fuel-air mixture.

5. The gas engine of claim 1, further comprising a sealing element closing off the mounting unit at an end opposite the heatable section, and a spring element, wherein the spring element urges the heating device against the heatable section and acts on the sealing element.

6. The gas engine of claim 1, wherein the heating device is a laser heating device.

7. The gas engine of claim 6, further comprising a sealing element closing off the mounting unit at an end opposite the heatable section, the sealing element comprising a coupling unit for at least one optical fiber and a focusing unit, wherein the focusing unit is configured to receive a laser light produced by the laser heating device and coupled via the at least one optical fiber into the mounting unit and to focus the received laser light on the heatable section.

8. The gas engine of claim 7, wherein the heatable section comprises a second surface facing away from the fuel-air mixture, and wherein the focusing unit is designed to focus the laser light produced by the laser heating device and coupled via the at least one optical fiber into the mounting unit on the second surface facing away from the fuel-air mixture.

9. The gas engine of claim 1, wherein the mounting unit is threadable to a wall forming a boundary of the combustion chamber or the precombustion chamber.

10. An ignition device for a gas engine for igniting a gaseous fuel-air mixture, comprising:

a heating device serving as an ignition source, and a mounting unit separating the heating device from the fuel-air mixture to be ignited, wherein the mounting unit comprises a heatable section in contact with the fuel-air mixture to be ignited, and wherein the heating device is configured to heat the heatable section to a temperature required to ignite the fuel-air mixture, the mounting unit being sleeve-shaped and the heatable section comprising a disk-shaped end part of the sleeve-shaped mounting unit, a geometry and a material of the heatable section being configured such that a surface of the heatable section facing the fuel-air mixture is heatable by the heating device to the temperature required to ignite the fuel-air mixture.

11. The ignition device of claim 10, wherein the heating device is an electrical heating device, and wherein the ignition device further comprises a sealing element closing off the mounting unit at an end opposite the heatable section, and a spring element, wherein the spring element urges the heating device against the heatable section and acts on the sealing element.

12. The ignition device of claim 10, wherein the heating device is a laser heating device, and wherein the ignition device further comprises a sealing element closing off the mounting unit at an end opposite the heatable section, the sealing element comprising a coupling unit for at least one optical fiber and a focusing unit, wherein the focusing unit is configured to receive a laser light produced by the laser heating device and coupled via the at least one optical fiber into the mounting unit and to focus the received laser light on the heatable section.

* * * * *